US006471128B1

(12) United States Patent
Corcoran et al.

(10) Patent No.: US 6,471,128 B1
(45) Date of Patent: Oct. 29, 2002

(54) METHOD OF MAKING A FOIL FACED FINANCIAL TRANSACTION CARD HAVING GRAPHICS PRINTED THEREON AND CARD MADE THEREBY

(75) Inventors: Jeffrey Corcoran, Somerville, NJ (US); Kurt Jacobsen, Annandale, NJ (US)

(73) Assignee: NBS Card Services, Inc., Plainfield, NJ (US)

( * ) Notice: Subject to any disclaimer, the term of this patent is extended or adjusted under 35 U.S.C. 154(b) by 0 days.

(21) Appl. No.: 09/526,064

(22) Filed: Mar. 15, 2000

(51) Int. Cl.[7] .............................................. G06K 19/02
(52) U.S. Cl. ....................................... 235/488; 235/493
(58) Field of Search ................................ 235/487, 488, 235/493; 902/25, 27, 28; 428/159; 427/528

(56) References Cited

U.S. PATENT DOCUMENTS

| | | | | |
|---|---|---|---|---|
| 4,022,943 | A | 5/1977 | Erb et al. | |
| 4,897,533 | A | 1/1990 | Lyszczarz | 235/487 |
| 5,326,966 | A | 7/1994 | Fukuda et al. | |
| 5,439,755 | A | 8/1995 | Fujita et al. | |
| 5,466,535 | A | 11/1995 | Higgins et al. | |
| 5,585,144 | A | 12/1996 | Waitts | |
| 5,786,587 | A | 7/1998 | Colgate, Jr. | |
| 5,962,137 | A | * 10/1999 | Ochiai et al. | 428/411.1 |

FOREIGN PATENT DOCUMENTS

| | | |
|---|---|---|
| DE | 198 40 631 A1 * | 6/2001 |
| JP | 7-214962 | 8/1995 |

OTHER PUBLICATIONS

PCT Written Opinion for PCT International Appln. No. PCT/US01/08294, mail date Dec. 27, 2001.

*International Standard*, ISO/IEC 7810; Aug. 15, 1995, Second edition. "Identification cards—Physical characteristics".

* cited by examiner

*Primary Examiner*—Karl D. Frech
*Assistant Examiner*—Jared J. Fureman
(74) *Attorney, Agent, or Firm*—Antonelli, Terry, Stout & Kraus, LLP

(57) ABSTRACT

An improved method of manufacturing a foil faced financial transaction card, particularly a secure card, and the card made thereby, wherein the card meets ANSI/ISO specifications for the characteristics of a financial transaction card including the specification for resistance to delamination while allowing graphics to be printed on the foil faced card using offset litho presses. Ultraviolet ink security graphics can also be applied. The method includes providing a plastic substrate layer and a metal containing foil layer having a front surface with a printable top coat layer thereon. The foil layer is mounted by its back surface on a surface of the substrate layer. A layer of an adhesive is applied to the printable top coat layer of the foil layer. Graphics are printed on the adhesive layer and a clear protective overlay provided on the front surface of the adhesive layer over the graphics thereon.

30 Claims, 2 Drawing Sheets

METHOD OF MAKING A FOIL FACED FINANCIAL TRANSACTION CARD HAVING GRAPHICS PRINTED THEREON AND CARD MADE THEREBY

TECHNICAL FIELD

The present invention is directed to an improved financial transaction card, particularly a secure card, and a method of making the same. The financial transaction card has a clear scratch resistant metallic surface with graphics printed thereon and meets ANSI/ISO specifications.

BACKGROUND AND SUMMARY OF THE INVENTION

The problems encountered in attempting to provide a financial transaction card which has an attractive scratch resistant metallic surface with printed graphics thereon are discussed in the introduction portion of assignee's U.S. Pat. No. 4,897,533. These problems include breakage of the thin metallized surface and/or lack of clarity in the over-laminate. Conventional offset lithography printing of a thin metallized surface on a thin plastic substrate such as a financial transaction card has also not been practical, especially in an automated process, since the details of the graphics, e.g., fine lines, etc., tend to blur.

The difficulties in making such a card are increased where a security feature involving printing additional security graphics is desired, making it more difficult to meet ANSI/ISO specifications for resistance to delamination. There is a need for an improved financial transaction card and a method of making the card wherein the card has an attractive foil face having graphics printed thereon which card can meet ANSI/ISO specifications for a secure card and at the same time permits the use of either offset litho press and/or silkscreen printing process for printing on the foil face.

This need is addressed by the method of the present invention for making a foil faced financial transaction card having graphics printed thereon. The method comprises providing a plastic substrate layer and a metal containing foil layer having a front surface with a printable top coat layer thereon. The metal containing foil layer is mounted by way of its back surface on a surface of the substrate layer. A layer of adhesive is applied to the printable top coat layer of the foil layer. Front graphics are printed on the front surface of the adhesive layer. A clear protective overlay is provided on the front surface of the adhesive layer over the graphics thereon. The card meets ANSI/ISO specifications for the characteristics of a financial transaction card. That is, the component layers of material that form the foil faced card are bonded to one another to the extent that any layer possesses a minimum peel strength of 3.4 lbf/in to resist delamination of the card.

In the disclosed embodiment, the method further comprises printing enhanced security graphics over the front graphics on the adhesive layer. The first graphics printed on the front surface of the adhesive layer can be printed using an offset litho press and/or silkscreen printing process. The front graphics are preferably printed on the adhesive layer using ultraviolet curable ink which is cured immediately after printing by exposure to ultraviolet light.

The method of the disclosed embodiment further comprises providing a second plastic substrate layer for the back of the card, printing graphics on one side thereon, collating the printed substrate layers with respect to clear plastic overlays and laminating the layers to bond the same to one another. The laminating is performed in a platen press under controlled conditions of temperature, pressure and cycle time of the platen press.

The improved foil faced financial transaction card of the invention has graphics printed thereon and, as stated above, the card meets ANSI/ISO specifications for the characteristics of a financial transaction card. This is the case even where the card includes enhanced security graphics printed over the front graphics on the adhesive layer. The card can also be embossed with letters and/or numerals, the tops of the embossed letters and/or numerals having tipping foil applied thereto. Additional security features, including a hologram and a tamper-proof signature panel can be hot stamped on the card while retaining the necessary structural integrity of the card to meet the ANSI/ISO specifications. The back of the card includes a magnetic stripe thereon in the disclosed embodiment.

These and other objects, features and advantages of the present invention will become more apparent from the following detailed description of the disclosed embodiment taken with the accompanying drawings.

DETAILED DESCRIPTION OF THE DISCLOSED EMBODIMENT

Figure 1:
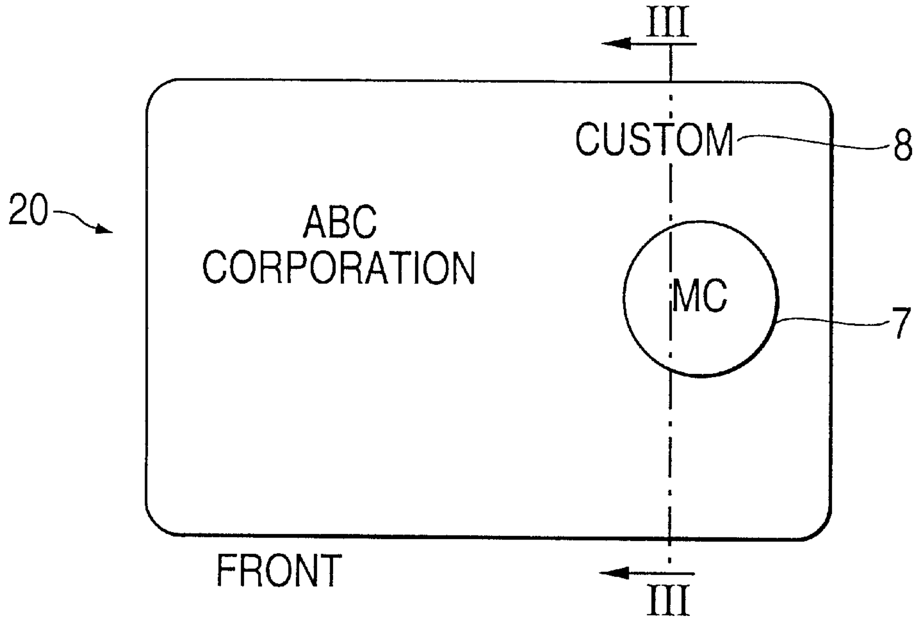
FIG. 1 is a top plan view of the front of a financial transaction card of the present invention.
Figure 2:
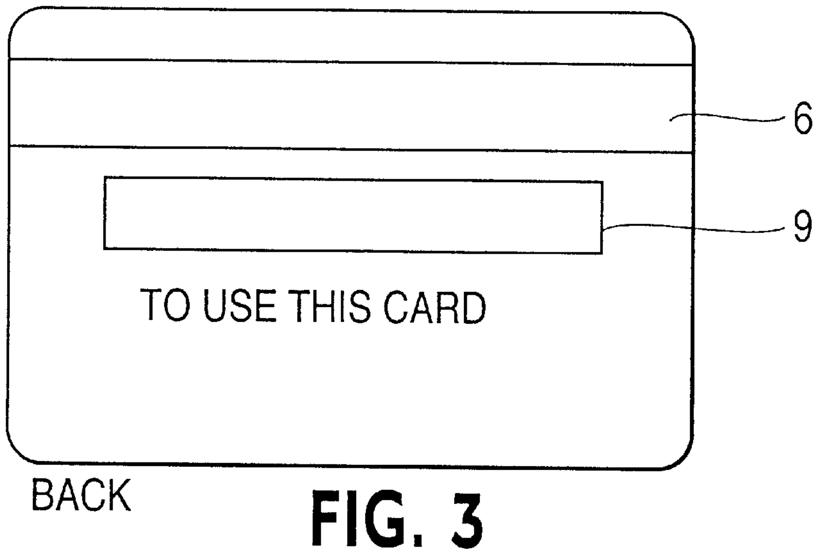
FIG. 2 is a top plan view of the back of the financial transaction card of FIG. 1.
Figure 3:
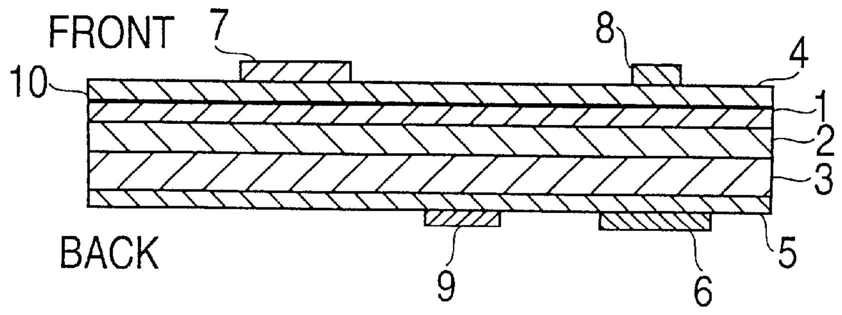
FIG. 3 is a cross-sectional view of the financial transaction card taken along the line 3—3 in FIG. 1.

Referring now to the drawings, a secure financial transaction card 20 of the invention is depicted in FIGS. 1–3. The card 20 meets the ANSI/ISO specifications for the characteristics of a financial transaction card, particularly ISO/IEC 7810:1995. Section 8.1.8 Delamination specification requires that component layers of material that form the card structure shall be bonded to the extent that any layer shall possess a minimum peel strength of 6 N/CM (3.4 lbf/in). Tearing of the overlay during the test signifies that the bond is stronger than the overlay, which is automatically deemed acceptable.

The method of making the foil faced financial transaction card 20 comprises providing a plastic substrate layer, for example, a rigid solid layer of polyvinyl chloride having a thickness of 26 mil, and a metal containing foil layer 1 having a front surface with a printable top coat layer thereon. In the illustrated embodiment, the metal containing foil layer 1 is a metallized polyester film with an overlay of copolymer thermal adhesive on both sides of the foil layer as a top coat for printing and as a bonding agent for mounting the foil layer on the substrate layer. Such a foil layer is commercially available. The thickness of the foil layer is 0.002 inch in the disclosed embodiment.

The metal containing foil layer 1 is mounted by way of its back surface on a surface of the substrate layer, substrate 2 in the disclosed embodiment, by a roll laminating process and a heat sensitive adhesive on the back of the metal containing foil layer.

An adhesive layer 10 is applied to the printable top coat layer of the foil layer, preferably before printing front graphics on the metal containing foil layer. In the disclosed embodiment, a vinyl based material with naptha and ketone solvents is employed. The adhesive has a laminating metallic clear base and is commercially available. The adhesive layer has a thickness on the order of 50 microns, particularly 51 microns, in the illustrated embodiment.

The adhesive layer 10 on the metal containing foil layer is then printed with front graphics on the front surface of the adhesive layer. The printing can be performed using an offset litho press or a silkscreen process. Enhanced security graphics can then be printed over the front graphics on the adhesive layer. It has been found that the use of ultraviolet ink security graphics over the front graphics on the metal containing foil layer result in an enhanced, vivid appearance when viewed under black light.

A clear protective overlay 4 is applied to the front surface of the adhesive layer 10 over the graphics thereon. This laminating is preferably performed in a platen press under controlled conditions of temperature, pressure and time. Additional security features, including a hologram 7 and a signature panel 9 are optionally applied to the card 20 by hot stamping. A magnetic stripe 6 can also be provided on the back overlay 5 of the card. The overlays 4 and 5 are 2 mil clear PVC in the disclosed embodiment. It is noted that the plastic substrate in the illustrated embodiment comprises two 13 mil white rigid PVC substrates which are collated with the clear protective overlays for lamination. As noted above, a single 26 mil white rigid PVC substrate could also be employed.

Figure 4:
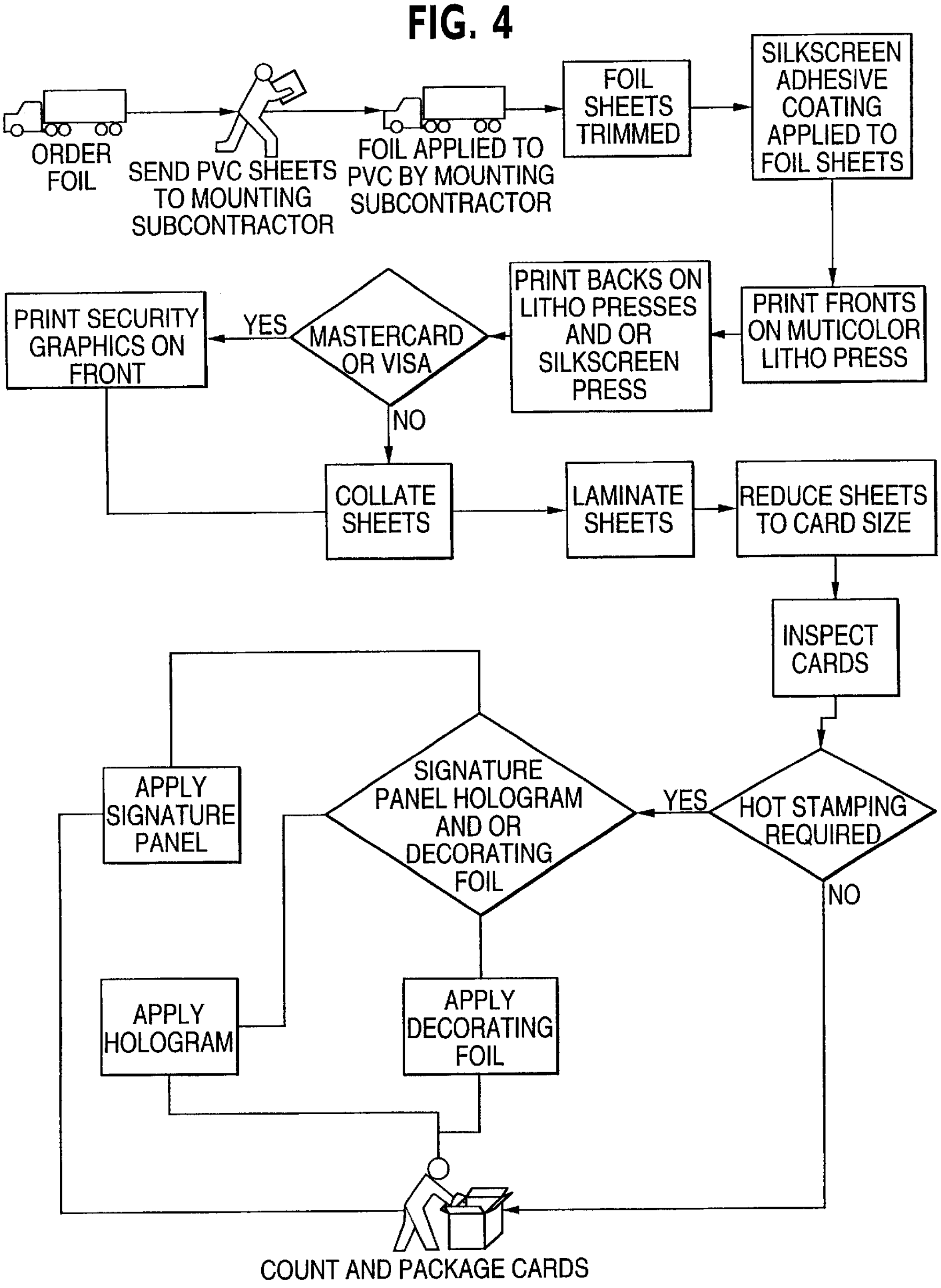
FIG. 4 is a flow diagram of the method of making the financial transaction card according to the invention.

The flow diagram of FIG. 4 schematically illustrates process steps in making the card. For this purpose, a quantity of foil is ordered from a subcontractor, who procures a designated foil design. The foil subcontractor applies a printable top coat to the front surface of the foil and a heat-activated adhesive to the back of the rolled foil. Rolls are sent to a subcontracted mounting contractor. A quantity of 13 mil rigid PVC sheets is sent to the subcontracted mounting contractor. The mounting contractor applies the foil to the PVC sheets via the heat-activated adhesive as referred to above and ships the composite back to the assignee's manufacturing facility.

The foiled PVC sheets are shear cut to improve feeding capabilities on printing presses. The adhesive coating 10 is applied, by a silkscreen process, to the front of the foil sheets to ensure lamination. Graphics are applied to the front foil sheets using multicolor UV offset litho presses, and/or a silkscreen process. Graphics for the back of the card are prepared on separate sheets of 13 mil white PVC. These graphics are printed using offset litho and/or silkscreen processes. Ultraviolet security graphics are offset litho printed over the front graphics on the foil faced substrate layer 2. The front and back sheets are moved to the lamination department of the next stage of the manufacturing process.

The sheets of fronts and backs are collated with 2.0 mil clear PVC on the front and 2.0 mil mag striped clear PVC on the back. The collated sheets are laminated in a platen press under controlled conditions. The laminated sheets are moved to the card reduction department where sheets are die cut to card size, which meet CR80 specifications. Cards are inspected for defects and non-conformances, counted and moved to the hot-stamp department. Signature panels 6, holograms 7 and other foil decorations 8, if specified, are applied to the cards. The finished cards 20 are then counted and packed according to customer specifications. The cards advantageously meet the ANSI/ISO specifications including that for delamination in that the component layers of material that form the foil faced card are bonded to one another to the extent that any layer possesses a minimum peel strength of 3.4 lbf/in to resist delamination of the card, even in the case printed security graphics are provided on the card in addition to the front graphics. The cards will also accept tipping foil and flat card printing when personalizing in standard equipment. The cards can also be hot stamped with the decorating foils and holograms and the card has improved wear resistance as compared with conventional cards the previous foil card of assignee's U.S. Pat. No. 4,897,533.

While we have shown and described only a single embodiment in accordance with the present invention, it will be apparent to the skilled artisan that variations in the disclosed card and method are possible without departing from the scope of the present invention. We therefore intend to be limited only by the scope of the following claims directed to the present invention.

We claim:

1. A foil faced financial transaction card having graphics printed thereon, which card meets ANSI/ISO specifications for the characteristics of a financial transaction card, said card comprising:

a rigid plastic sheet substrate layer;

a metal containing foil layer adhesively bonded on its back surface to a surface of said substrate layer, a front surface of said foil layer having a printable layer thereon;

printed ink graphics overlying the front surface of the printable layer;

a clear protective overlay adhesively bonded on the surface of the card over it said graphics thereon;

wherein the component layers of material that form the foil faced card are bonded to one another to the extent that any layer possesses a minimum peel strength of 3.4 lbf/in to resist delamination of said card.

2. The card according to claim 1, wherein said card is a secure card comprising at least one security feature on the foil faced surface of the card.

3. The card according to claim 2, wherein the at least one security feature includes enhanced security graphics printed on the front surface of the printable layer.

4. The card according to claim 3, wherein the enhanced security graphics are printed over the graphics overlying the front surface of the printable layer.

5. The card according to claim 3, wherein the enhanced security graphics are formed of ultraviolet ink.

6. The card according to claim 2, wherein the at least one security feature includes a hologram.

7. The card according to claim 1, wherein said foil layer is bonded to said substrate layer by a heat-activated adhesive using a roll laminating process.

8. The card according to claim 1, wherein said printed ink graphics are formed of ink applied using an offset litho press and/or a silkscreen printing process.

9. The card according to claim 1, wherein said card is embossed with letters and/or numerals, tops of said embossed letters and/or numerals having tipping foil applied thereto.

10. The card according to claim 1, wherein said card is a secure card having at least one security feature selected from the group consisting of a hologram hot stamped thereon, a tamper-proof signature panel hot stamped on said card, and ultraviolet ink security graphics printed over said printed ink graphics.

11. The card according to claim 1, wherein said substrate layer comprises two rigid sheets of plastic material laminated to one another.

12. The card according to claim 1, wherein said clear protective layer is a polyvinyl chloride sheet.

13. The card according to claim 1, wherein said card has a magnetic stripe on an outer surface thereof.

14. The card according to claim 1, wherein the printable layer on the front surface of the foil layer includes a printable top coat layer on the front surface and an adhesive layer applied to the printable top coat layer.

15. A method of making a foil faced financial transaction card having graphics printed thereon, which card meets ANSI/ISO specifications for the characteristics of a financial transaction card, said method comprising:

providing a rigid plastic sheet substrate layer and a metal containing foil layer having a front surface with a printable layer thereon;

mounting said metal containing foil layer by way of its back surface on a surface of said substrate layer;

printing ink graphics over a front surface of the metal containing foil layer;

providing a clear protective overlay on the front surface of the metal containing foil layer over said graphics thereon;

wherein the component layers of material that form the foil faced card are bonded to one another to the extent that any layer possesses a minimum peel strength of 3.4 lbf/in to resist delamination of said card.

16. The method according to claim 15, further comprising printing enhanced security graphics on the front surface of the metal containing foil layer.

17. The method according to claim 15, further comprising applying an adhesive layer on the front surface of the metal containing foil layer after the foil layer is mounted on the substrate layer.

18. The method according to claim 17, including applying the adhesive layer on the front surface of the metal containing foil layer by a silkscreen operation.

19. The method according to claim 17, wherein the front graphics are printed on the front surface of the metal containing foil layer over the adhesive layer applied thereon.

20. The method according to claim 17, wherein the adhesive layer is applied after printing said ink graphics on the front surface of the metal containing foil layer.

21. The method according to claim 15, wherein said metal containing foil layer is a metallized polyester film with an overlay of copolymer thermal adhesive on both sides of said foil layer as said printable layer and as a bonding agent for mounting said foil layer on said substrate layer.

22. The method according to claim 15, wherein said mounting is performed by a roll laminating process.

23. The method according to claim 15, wherein said ink graphics are printed using offset litho and/or silkscreen printing.

24. The method according to claim 15, including applying at least one security feature to said card.

25. The method according to claim 24, wherein the at least one security feature includes ultraviolet ink security graphics printed on the front surface of containing foil layer.

26. The method according to claim 25, further comprising applying at least one of a hologram and a tamper-proof signature panel to the card by hot stamping.

27. The method according to claim 15, further comprising providing a second rigid plastic sheet substrate layer for said card, printing graphics on one side thereof, collating said printed substrate layers with clear protective overlays and laminating said layers to bond the same to one another.

28. The method according to claim 27, wherein said laminating is performed in a platen press under controlled conditions of temperature, pressure and cycle time of the platen press.

29. The method according to claim 15, further comprising embossing said card and applying foil to the tips of embossments formed on the card.

30. The method according to claim 15, wherein the clear protective overlay on the front surface of the metal containing foil layer is a polyvinyl chloride sheet.

* * * * *